J. HEMJE.
FENDER REGULATOR FOR CULTIVATORS.
APPLICATION FILED MAR. 7, 1919.

1,325,471.

Patented Dec. 16, 1919.
2 SHEETS—SHEET 1.

Inventor
John Hemje,
By Jerry A Mathews
and Lester L Sargent
Attorney

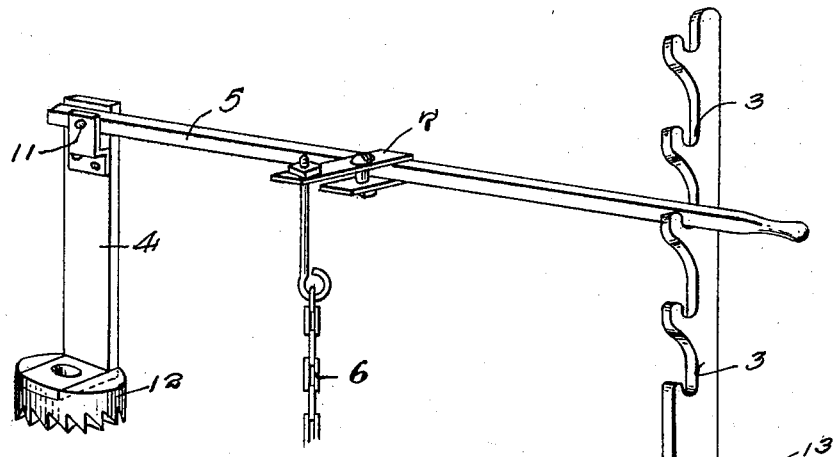
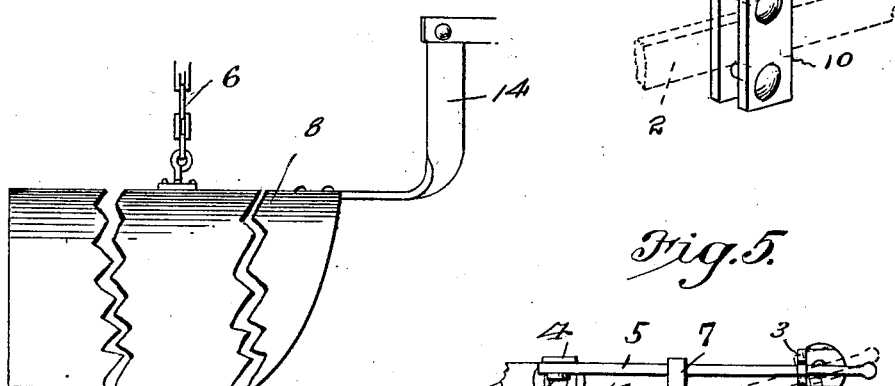
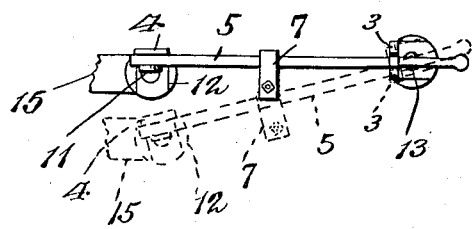

UNITED STATES PATENT OFFICE.

JOHN HEMJE, OF HILDRETH, NEBRASKA.

FENDER-REGULATOR FOR CULTIVATORS.

1,325,471.  Specification of Letters Patent.  Patented Dec. 16, 1919.

Application filed March 7, 1919. Serial No. 281,122.

*To all whom it may concern:*

Be it known that I, JOHN HEMJE, a citizen of the United States, residing at Hildreth, in the county of Franklin and State of Nebraska, have invented a new and useful Fender-Regulator for Cultivators, of which the following is a specification.

The object of my invention is to provide a fender regulator for cultivators, which is capable of regulation while the cultivator is in operation to control the depth at which the fender or shovel passes through the ground, as it is necessary that an even depth be maintained in order that the furrows may not later be washed away due to uneven depth.

In the accompanying drawings illustrating my invention—

Fig. 3 is a detail perspective view of the attachment;

Fig. 4 is a detail view of the fender 8, and

Fig. 5 is a diagrammatic view showing bars 3 and 4 in normal position and also in adjusted position.

Like characters of reference designate like parts throughout the several views.

Figure 1:
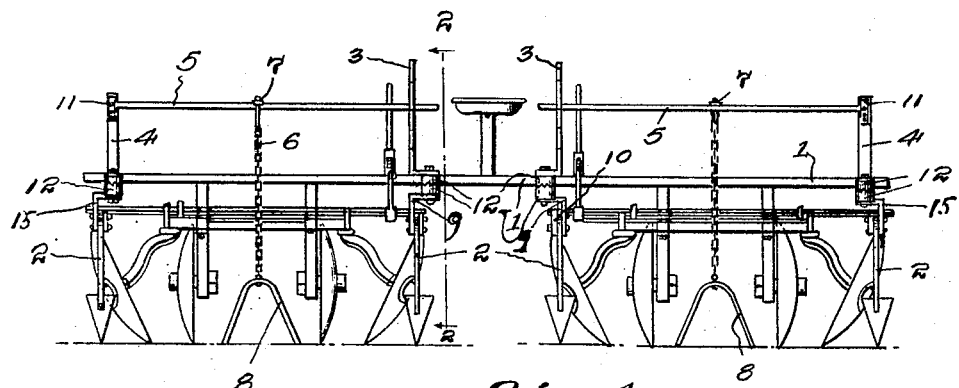
Figure 1 is a rear elevation of my invention applied to a two-row corn cultivator.

Referring to the accompanying drawings, I provide a suitable fender 8, having an arm 14 pivotally attached to the cultivator frame. I further provide means for adjusting the depth at which the fender, and more especially its rear portion, trails, consisting of a suitable chain or cable 6 attached to a lever 5, one end of which is adjustably supported by a suitable notched bar 3 in proximity to the seat of the cultivator, and the other end of lever 5 being suitably pivoted by member 11 to an upright 4 which is suitably affixed to a ratchet nut 12, which adjustably engages a similar ratchet nut 12 carried by arm 15, which is attached to the cultivator frame, as shown in Fig. 1, by member 9. Any suitable attaching member such as 7 may be used for securing chain 6 to lever 5.

Figure 2:
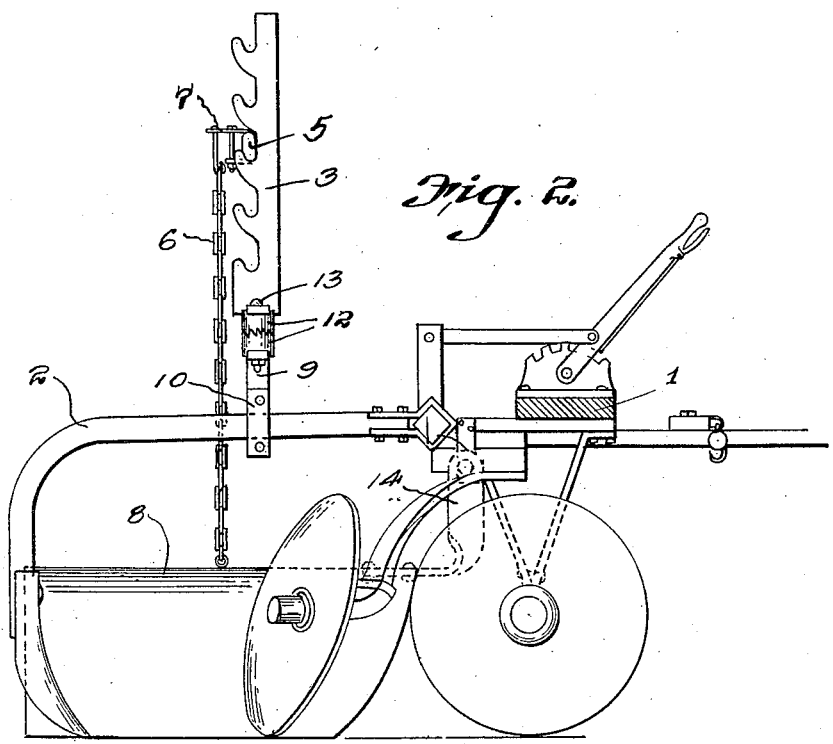
Fig. 2 is a side elevation of same from line 2—2 of Fig. 1.

Referring to Fig. 3 of the drawings, I provide novel means for adjusting the positions of uprights 4 and ratchet posts or notched bars 3, consisting of similar interlocking ratchet nuts 12, which are secured in adjusted position by a suitable bolt 13. This device permits of adjusting the attachment so that the lever 5 will engage the notched bar of the particular cultivator on which the attachment may be mounted. Member 2 is the cultivator arm and member 1 the cross beam of the cultivator. Member 9 is secured to arm 2 by any suitable attaching member such as member 10, as shown in Fig. 2.

The fenders are regulated by raising or lowering levers 5, the ends of which are within convenient reach of the operator seated on the cultivator. The notched bars 3 hold the levers in the position to which they are adjusted by the operator. The ratchet nuts 12 make possible the adjustment of the attachment to conform to any angle of the cultivator beam or arm 2. The fenders are regulated by the operator to conform to the uneven condition of the soil.

What I claim is:

1. An attachment for cultivators comprising a pivotally supported lever, a fender suspended from said lever, a notched bar with the notched portion of which the handle of the lever may be supported, said handle being disposed in proximity to the seat of the cultivator, interlocking ratchet nuts for adjusting the attachment in the arc of a circle relative to the supporting beam of the cultivator, and means for securing said ratchet nuts in the adjusted position whereby the fender may be maintained in a desired adjusted position over the rows of plants and the device thus adapted for use with any cultivator, substantially as shown.

2. An attachment for cultivators, comprising oppositely disposed levers having their handles positioned in proximity to the seat of the cultivator, fenders suspended from the central portion approximately of said levers, notched upright bars positioned to support the levers in the position to which they are raised or lowered, uprights to which the ends of the levers are pivoted, corresponding interlocking ratchet nuts to which the uprights and the notched bars are attached, means for supporting the ratchet nuts and attached members from the beams of the cultivators, and means for fastening the ratchet nuts in the adjusted positions to which they may be moved whereby to conform the adjustment of the attachment to any angle of the cultivator beam or arm, substantially as and for the purposes described.

JOHN HEMJE.

Witnesses:
C. N. MORGAN,
C. P. HEMJE.